United States Patent
Yokouchi

(10) Patent No.: US 7,489,842 B2
(45) Date of Patent: Feb. 10, 2009

(54) ATTACHMENT-TYPE OPTICAL COUPLER APPARATUSES

(75) Inventor: Kishio Yokouchi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/837,296

(22) Filed: Aug. 10, 2007

(65) Prior Publication Data

US 2007/0274638 A1    Nov. 29, 2007

Related U.S. Application Data

(62) Division of application No. 10/946,029, filed on Sep. 20, 2004, now Pat. No. 7,257,295.

(51) Int. Cl.
*G02B 6/26* (2006.01)
(52) U.S. Cl. ............................... 385/40; 385/2; 385/30; 385/50
(58) Field of Classification Search ................ None
See application file for complete search history.

(56) References Cited

U.S. PATENT DOCUMENTS

| | | | |
|---|---|---|---|
| 4,184,738 A | 1/1980 | Wright | |
| 4,208,091 A * | 6/1980 | Cheo et al. ..................... | 385/3 |
| 5,195,154 A | 3/1993 | Uchida | |
| 5,757,989 A | 5/1998 | Yoshimura et al. | |
| 6,343,171 B1 | 1/2002 | Yoshimura et al. | |
| 6,393,183 B1 | 5/2002 | Worley | |
| 6,400,855 B1 | 6/2002 | Li et al. | |
| 6,470,118 B1 | 10/2002 | Uno | |
| 6,504,966 B2 | 1/2003 | Kato et al. | |
| 6,603,915 B2 | 8/2003 | Glebov et al. | |
| 6,608,946 B2 * | 8/2003 | Kikuchi et al. ................. | 385/14 |
| 6,611,635 B1 | 8/2003 | Yoshimura et al. | |
| 6,661,949 B1 * | 12/2003 | James et al. .................... | 385/30 |
| 6,690,845 B1 | 2/2004 | Yoshimura et al. | |
| 6,791,675 B2 | 9/2004 | Kikuchi et al. | |
| 6,823,097 B2 | 11/2004 | Glebov et al. | |
| 6,828,606 B2 | 12/2004 | Glebov | |

(Continued)

OTHER PUBLICATIONS

L. Dalton et al., "Polymeric Electro-optic Modulators: From Chromophore Design to Integration with Semiconductor Very Large Scale Integration Electronics and Silica Fiber Optics," Ind. Eng. Chem. Res., Jan. 1999, pp. 8-33, vol. 38, No. 1.

(Continued)

*Primary Examiner*—Sung H Pak
*Assistant Examiner*—Mike Stahl
(74) *Attorney, Agent, or Firm*—Baker Botts L.L.P.

(57) ABSTRACT

Optical couplers having attachment features are disclosed. A typical coupler according to the present invention couples an optical signal from an optical fiber to a channel waveguide by overlapping the cores of the optical fiber and channel waveguide along a portion of their waveguide lengths, with a spacing distance between the cores of not more than 20 microns for single-mode light coupling, and not more than 100 microns for multi-mode light coupling. This is in contrast to a prior art coupler, which seeks to position the ends of the two cores in a facing relationship. In embodiments according to the present invention, attachment films may be disposed in the overlapping regions to provide advantageous coupling arrangements and new types of opto-electric devices.

10 Claims, 6 Drawing Sheets

U.S. PATENT DOCUMENTS

| | | |
|---|---|---|
| 6,904,220 B2 | 6/2005 | Shimada et al. |
| 2001/0004410 A1* | 6/2001 | Kondo et al. .................... 385/2 |
| 2002/0114556 A1 | 8/2002 | Kato et al. |
| 2003/0035614 A1 | 2/2003 | Glebov et al. |
| 2003/0035632 A1 | 2/2003 | Glebov et al. |
| 2003/0044100 A1* | 3/2003 | Kondo et al. .................... 385/3 |
| 2003/0067676 A1 | 4/2003 | Wang et al. |
| 2003/0081902 A1 | 5/2003 | Blauvelt et al. |
| 2003/0103712 A1 | 6/2003 | Glebov et al. |
| 2003/0194192 A1 | 10/2003 | Ido et al. |
| 2003/0202732 A1 | 10/2003 | Glebov et al. |
| 2003/0206675 A1 | 11/2003 | Glebov et al. |
| 2004/0013378 A1 | 1/2004 | Lee et al. |
| 2004/0028316 A1 | 2/2004 | Yokouchi |
| 2004/0126056 A1 | 7/2004 | Aoki et al. |
| 2004/0126079 A1 | 7/2004 | Aoki et al. |
| 2004/0184704 A1 | 9/2004 | Bakir et al. |
| 2004/0206988 A1 | 10/2004 | Glebov |
| 2005/0025408 A1 | 2/2005 | McIntyre et al. |
| 2007/0014519 A1* | 1/2007 | Aoki ........................... 385/50 |

OTHER PUBLICATIONS

S. Garner, et al., "Three-Dimensional Integrated Optics Using Polymers" IEEE Journal of Quantum Electronics, Aug. 1999, pp. 1146-1155, vol. 35, No. 8.

Glebov, et al., "Two-dimensional microlens arrays in silica-on-silicon planar lightwave circuit technology," J. Microlith., Microfab., Microsyst., Oct. 2003, pp. 309-318, vol. 2, No. 4.

* cited by examiner

US 7,489,842 B2

ATTACHMENT-TYPE OPTICAL COUPLER APPARATUSES

CROSS REFERENCE TO RELATED APPLICATIONS:

This application is a divisional of U.S. Application Serial No.10/946,029, filed Sep. 20, 2004 now U.S. Pat. No. 7,257,295, by Kishio Yokouchi and entitled "Attachment-Type Optical Coupler Apparatus".

FIELD OF THE INVENTION

The present invention relates to connecting optical signals to substrates and between substrates and the like. The present invention more particularly relates to optical couplers for such connections.

BACKGROUND OF THE INVENTION

In order to increase the bandwidth and communication speed of many computer and communication systems, optical fibers and optical components are increasingly being integrated into electronic systems. This integration typically involves conveying hundreds to thousands of optical signals between several substrates using optical fibers. FIG. 1 shows a cross-sectional view of a conventional coupler 1, which couples an optical fiber 4 to a channel waveguide 8 on a substrate 9. As shown in the figure, the end of the optical fiber is positioned to face the end of the channel waveguide. The core of the optic fiber typically has a circular cross-section, while the core of the channel waveguide typically has a square or rectangular cross-section.

SUMMARY OF THE INVENTION

As part of making his invention, the inventor has recognized that current optical fiber technology is placing practical limits on the number of optical signals that can be incorporated in electronic systems because the connectors used to attach optical fibers to boards are relatively large. In addition, the inventor has recognized that these connectors often cause misalignment between the cores of the optical fibers and the cores of the channel waveguides on the substrates. While these misalignment problems could be addressed by using precision-manufactured connector components, such components are very expensive.

Accordingly, the inventor has recognized that there is a need to address simultaneously the issues of size, alignment, and cost of connecting optical fibers to substrates and the like.

A typical coupler according to the present invention couples an optical signal from an optical fiber to a channel waveguide by overlapping the cores of the optical fiber and channel waveguide along a portion of their waveguide lengths, with a spacing distance between the cores of not more than 20 microns when single-mode light is being coupled, and not more than 100 microns when multi-mode light is being coupled. This is in contrast to prior art couplers that position the ends of the two cores in a facing relationship. Attachment films may be disposed in the overlapping regions to provide advantageous coupling arrangements and to enable new types of opto-electric devices.

Accordingly, it is an object of the present invention to reduce the area needed to provide substrate-to-substrate optical coupling.

It is another object of the present invention to increase the accuracy of the alignment of optical couplers to optical substrates.

It is yet another object of the present invention to reduce the costs of optical couplers and the costs associated with aligning optical couplers to optical substrates.

It is yet another object of the present invention to enable the creation of new opto-electric devices.

These and other objects of the invention will become apparent to one of ordinary skill in the art in view of the present specification, claims, and attached drawings.

DETAILED DESCRIPTION OF THE INVENTION

Figure 2:
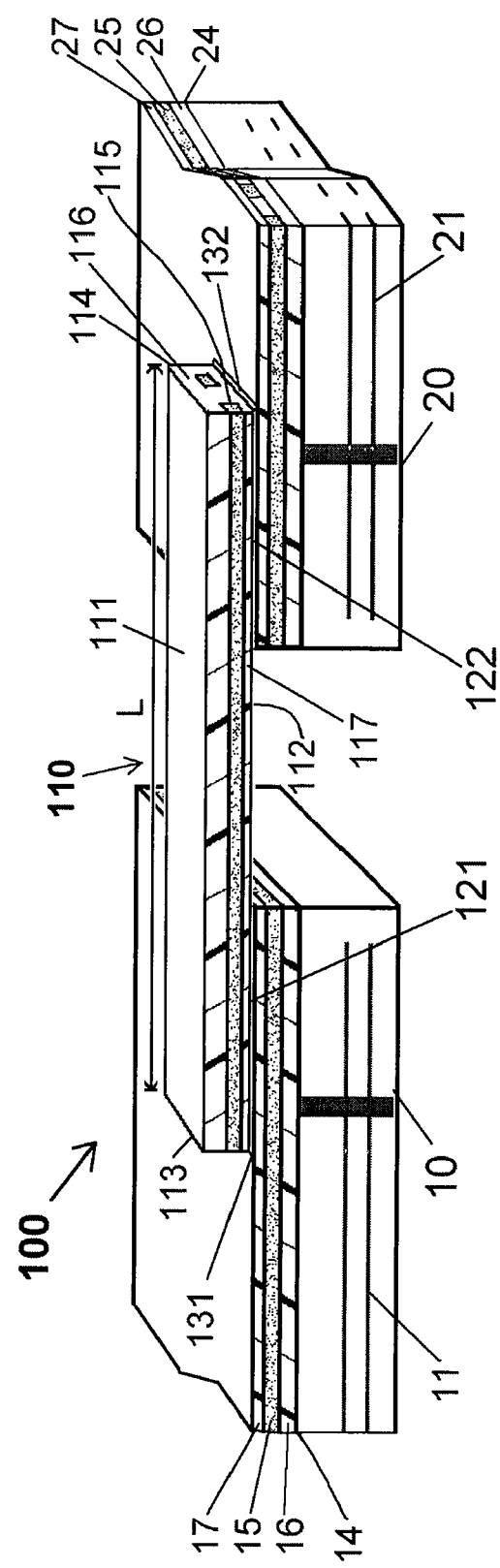
FIG. 2 shows a first embodiment of an attachment-type optical coupler according to the present invention.

FIG. 2 shows a first embodiment 100 of the present invention, as used in a first application of the invention to couple optical signals between two substrates 10 and 20. Substrate 10 has a waveguide layer 14 formed over its top surface, and a network 11 of electrical traces. Waveguide layer 14 preferably comprises a plurality of channel waveguides. Opto-electronic devices (not shown in FIG. 2) may be disposed on, within, or under the waveguide layer 14 to transmit or receive optical signals from waveguide layer 14. In a similar manner, substrate 20 has a waveguide layer 24 formed over its top surface, and a network 21 of electrical traces. Waveguide layer 24 preferably comprises a plurality of channel waveguides. Opto-electronic devices (not shown in FIG. 2) may be disposed on, within, or under the waveguide layer 24 to transmit or receive optical signals from waveguide layer 24.

Optical coupler 100 comprises an element 110 having a top surface 111, a bottom surface 112, a first end 113, a second end 114, and a length L between the first and second ends. (As used herein, the term "element" broadly means a part of a larger component; in this case, optical coupler 110.) Element 110 further comprises a body 115 of core material disposed between the top surface 111 and bottom surface 112 and extending along the length L. (As used herein, the term "body" has the generic meaning of an individual three-dimensional object that has mass and that is distinguishable from other objects.) Body 115 may have the shape of a strip with an elongated dimension running substantially parallel to the length L, and with a cross-section that is square, rectangular, circular, or oval-shaped (e.g., like the core of an optical fiber or channel waveguide). Element 110 further comprises a first layer 116 of cladding material disposed between body 115 of core material and top surface 111 of element 110, and may comprise an optional second layer 117 of cladding material disposed between body 115 and bottom surface 112 of element 110. As used herein, the terms "core material" and "cladding material" have their broad meanings in the optics art. Specifically, light is conveyed mainly in the core material, as confined by the cladding material, with there being a difference in refractive-index properties between the two materials. For example, for simple and common optics materials having "real" refractive indices (as opposed to "complex" refractive indices), the cladding layer has a refractive index that is lower than that of the core material (typically at least 0.2%, and more typically between 0.2% and 5%). In this manner, the body 115 of core material is constructed to convey light in a direction that is substantially parallel to the bottom surface 112 of element 110.

Figure 3:
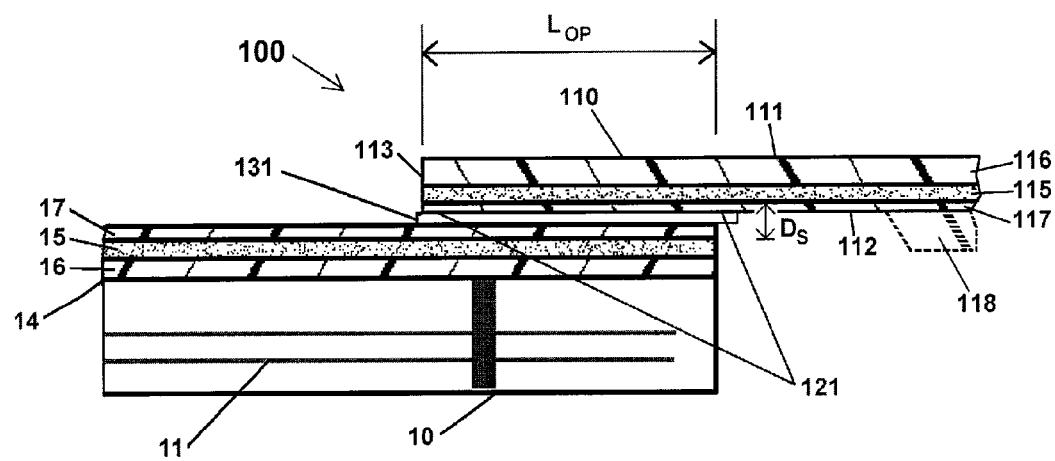
FIG. 3 shows a cross-sectional view of a portion of the attachment-type optical coupler shown in FIG. 2 according to the present invention.

Optical coupler 100 further comprises a first attachment region 121 located on the bottom surface 112 of element 110, near first end 113. First attachment region 121 is disposed over a portion of substrate 10 and is attached thereto by a first film 131 of adhesive material disposed on first attachment region 121. Film 131 is best seen in FIG. 3, which is a partial cross-sectional view of optical coupler 100 in the region where it attaches to substrate 10. The reference numbers shown in FIG. 3 are the same as shown in FIG. 2. First adhesive film 131 has a top surface and a bottom surface opposite the top surface, with its top surface abutting and adhered to the bottom surface 112 of element 110 at first attachment region 121, and with its bottom surface abutting and adhered to a portion of the top surface of substrate 10. Adhesive film 131 is preferably manufactured such that its bottom surface is in a sticky state prior to being adhered to the top surface of substrate 10. Adhesive film 131 may comprise an adhesive material that enables it and element 110 to be readily detached from substrate 10 to enable testing and/or replacement of substrate 10. Adhesive film 131 typically has a peal strength of at least 10 to 15 grams per cm (in other words, it takes a peal force of at least 0.1 to 0.15 N/cm to peal off adhesive film 131), and preferably a peal strength of at least 10 g/cm (peal force of 1N/cm). Underneath attachment region 121 is optical waveguide 14 of substrate 10, which has a lower cladding layer 16, a core body 15, and an optional upper cladding layer 17. In a substantial portion of attachment region 121, the distance from the bottom surface of core body 115 of optical coupler 100 and the top surface of core body 15 is small, as indicated by reference notation $D_S$ in FIG. 3. As explained below in greater detail, distance $D_S$ is not more than 20 µm when the light in core bodies 15 and 115 is single-mode, and not more than 100 µm when the light in core bodies 15 and 115 is multi-mode. This short distance between the bodies of core material enables light to be coupled between core bodies 115 and 15, regardless of the propagation direction of the light (i.e., right to left, or left to right).

In addition, optical coupler 100 preferably further comprises a second attachment region 122 located on the bottom surface 112 of element 110, near second end 114. Second attachment region 122 is disposed over a portion of substrate 20 and is attached thereto by a second film 132 of adhesive material disposed on second attachment region 122. Second adhesive film 132 has a top surface and a bottom surface opposite the top surface, with its top surface abutting and adhered to the bottom surface 112 of element 110 at second attachment region 122, and with its bottom surface abutting and adhered to a portion of the top surface of substrate 20. Adhesive film 132 is preferably manufactured such that its bottom surface is in a sticky state prior to being adhered to the top surface of substrate 20. Adhesive film 132 may comprise an adhesive material that enables it and element 110 to be readily detached from substrate 20 to enable testing and/or replacement of substrate 20. Adhesive film 132 typically has a peal strength of at least 10 to 15 grams per cm (in other words, it takes a peal force of at least 0.1 to 0.15 N/cm to peal off adhesive film 132), and preferably a peal strength of at least 100 g/cm (peal force of 1N/cm). Underneath attachment region 122 is optical waveguide 24 of substrate 20, which has a lower cladding layer 26, a core body 25, and an optional upper cladding layer 27. In a substantial portion of attachment region 122, the spacing distance from the bottom surface of core body 115 of optical coupler 100 and the top surface of core body 25 is small, as indicated by reference notation $D_S$ in FIG. 3. As explained below in greater detail, distance $D_S$ is not more than 20 µm when the light in core bodies 15 and 115 is single-mode, and not more than 100 µm when the light in core bodies 15 and 115 is multi-mode. This short distance between the bodies of core material enables light to be coupled between core bodies 115 and 25, regardless of the propagation direction of the light (i.e., right to left, or left to right).

By techniques well known to the art, core body 15 may be configured to convey light having only a single transverse mode (called "single-mode light"), or may be configured to convey light having multiple transverse modes (called "multi-mode light"). As used herein and in the claims, the expressions "configured to convey light" means that the core body is configured to support the propagation of light along the core body in the particular mode-type. In general, core body 115 is configured to convey the same type of light (single-mode or multi-mode) as core body 15. The number of modes that can propagate along a waveguide core depends upon the transverse dimensions of the waveguide core in comparison to the wavelength of the light, and on the difference in the refractive indices of the core and cladding materials. In general, for light having wavelengths in the red region (~0.9 µm to ~1.6 µm), the transverse dimensions of the core body are between ~5 µm and ~9 µm for single-mode propagation, and between ~15 µm and ~100 µm for multi-mode propagation. Many tutorial textbooks on waveguide design have graphs and formulas that compute the difference in the refractive indices needed to achieve a single-mode waveguide or multi-mode waveguide given the transverse dimensions of the waveguide core. The reader who is unfamiliar with this area is directed to these texts.

This distinction between single-mode light and multi-mode light is important because each mode-type couples light across the attachment region in a different manner. In general, the coupling of single-mode coupling requires a smaller spacing distance $D_S$ than multi-mode light. In the present invention, in general, the spacing distance $D_S$ is 20 µm or less when the light in core bodies 15 and 115 is single-mode, and 100 µm or less when the light in core bodies 15 and 115 is multi-mode.

Figure 4:
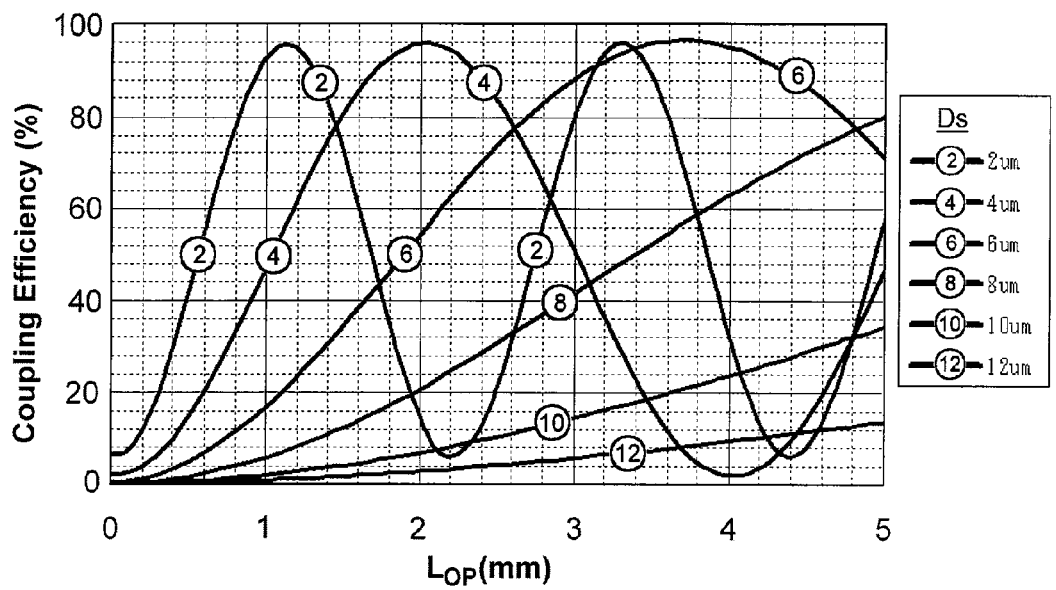
FIG. 4 shows a graph of the coupling efficiency as a function of spacing distance and overlap length for exemplary embodiment according to the present invention.

The coupling efficiency between the core bodies depends upon the spacing distance $D_S$ and by the amount that the core bodies overlap one another, which is designated as overlap distance $L_{OP}$ in FIG. 3. Typically, the length of first attachment film 131, as measured along the dimension of the length L of element 110 (and along the elongated dimension of core body 115), is substantially equal to overlap distance $L_{OP}$. Similarly, the length of the second attachment film 132 is substantially equal to the overlap distance between element 110 and substrate 20. The coupling efficiency increases as the spacing distance $D_S$ decreases, and also increases as the overlap distance $L_{OP}$ increases, up to a certain point. To illustrate the coupling efficiency, we take the following example of core bodies 115 and 15 being configured to convey light in single-mode and in the 1.55 μm wavelength band. Each core body has a substantially square cross-section of 7 μm per side, and a refractive index of 1.567. The cladding layers 16 and 116 have a refractive index of 1.563, and thicknesses of around 15 μm. Attachment film 131 has a refractive index of around 1.563. FIG. 4 shows the coupling efficiency (in percentage) as a function of overlap length $L_{OP}$ for the following values of spacing distance $D_S$: 2 μm, 4 μm, 6 μm, 8 μm, 100 μm, and 12 μm. The curves were computed by commercially available light-wave simulation software (e.g., 3D-OptiBPM by the Optiwave Corporation). The simulation was performed with the fundamental mode of core body 15 as the starting beam field. The coupling efficiency to core body 115 was calculated by an overlap integral with the fundamental mode field of core body 115. As can be seen in the figure, a coupling efficiency as high as 95% can be achieved for spacing distances of 2 μm, 4 μm, 6 μm, and 8 μm when using overlap lengths $L_{OP}$ of 1.1 mm, 2 mm, 3.7 mm, and approximately 6.5 mm, respectively. In each of these cases, the ratio of $L_{OP}$ to $D_S$ ($L_{OP}/D_S$) is 500 or above. The curves are periodic in nature, and the coupling efficiency decreases with $L_{OP}$ after a certain amount of overlap. Back-reflection effects cause the decrease in coupling efficiency after the maximum value is reached. Thus, it is not desirable to increase the overlap distance beyond the value that gives the maximum coupling efficiency since this may introduce undesirable noise into core body 15. Therefore, $L_{OP}$ is preferably not more than 150% of the length needed for maximum coupling efficiency (for a given value of $D_S$), and preferably not more than 100% of the length needed for maximum coupling efficiency.

For general single-mode coupling applications, a coupling efficiency of at least 65% is desirable. From the example of FIG. 4, a coupling efficiency of 65% can be achieved for spacing distances of 2 μm, 4 μm, 6 μm, and 8 μm when using overlap lengths $L_{OP}$ of 0.7 mm, 1.23 mm, 2.23 mm, and 4.05 mm, respectively. In each of these cases, the ratio of $L_{OP}$ to $D_S$ ($L_{OP}/D_S$) is at or above 300. At a coupling efficiency of 80%, the ratio of $L_{OP}$ to $D_S$ ($L_{OP}/D_s$) is at or above 400. To achieve the same coupling efficiency, the overlap distance $L_{OP}$ may be decreased if the spacing distance $D_S$ is decreased, and may be increased if the spacing distance $D_S$ is increased. For example, an optical coupler 100 with $L_{OP}$=2.1 mm and $D_S$=5 μm has substantially the same coupling efficiency as an optical coupler with $L_{OP}$=1.1 mm and $D_S$=2 μm. Since the coupling efficiency is relatively sensitive to spacing distance $D_S$, it is preferable to maintain the value of $D_S$ within a tolerance of 0.5 μm of its target value.

For specialized multi-layer optical wiring technologies, is it very possible to have a spacing distance $D_S$ smaller than 5 μm, such as in the range of 2 μm to 5 μm. For general multi-layer optical wiring technologies, a spacing distance $D_S$ of 4 μm or more is practical. In both cases, for single-mode coupling operations, the distance $L_{OP}$ generally becomes longer than desirable when using values of spacing distance $D_S$ of more than about 12 μm to 14 μm. Thus, for single-mode coupling operations in general multi-layer optical wiring technologies, a useful range for $D_S$ is about 4 μm to about 14 μm, with values of 12 μm, 9 μm, and 6 μm being good choices. Typically, $L_{OP}$ has a value of at least 1 mm, and more typically of at least 2 mm, and the ratio of $L_{OP}/D_S$ is maintained at a value of at least 200 in order to achieve a coupling efficiency of at least 35%. In preferred embodiments, the ratio $L_{OP}/D_S$ is equal to or greater than 300 to obtain greater coupling efficiency (usually at least ~65%), and equal to or greater than 400 to obtain even greater coupling efficiency (usually at least 80%). While these ratio values are for the specific example of cores with square cross-sections of 7 μm per side and a refractive index of 1.567 and cladding layers having a refractive index of 1.563, they provide one of ordinary skill in the art with general guidance. It may be appreciated that one of ordinary skill in the art can select the values of $L_{OP}$ and $D_S$ for his or her specific waveguide construction to meet a coupling efficiency of at least 35%, or of at least 65%, or of at least 80%, or more. This can be done without undo experimentation by constructing an array of test structures that vary the values of $L_{OP}$ and $D_S$, and then measuring the resulting coupling efficiencies to find the values of $L_{OP}$ and $D_S$ that meet the desired coupling efficiency. This task may also be performed by some commercially available waveguide optics simulation programs.

For general multi-mode coupling applications, the selection of $D_S$ and $L_{OP}$ become more complex because the coupling is dependent upon the configuration of the modes. In general, the value of $D_S$ is equal to or less than 100 μm, and more typically equal to or less than 50 μm. $L_{OP}$ is selected to provide the desired coupling efficiency, and is typically in the several millimeters to tens of millimeters range. Since the single-mode waveguides offer the greater densities of optical signals, they will be focused on in the remaining discussion.

The spacing distance $D_S$ between core bodies 115 and 15 may be made smaller by removing upper cladding layer 17 in the area of first attachment region 121. This means that the distance $D_S$ is set by the combined thickness of upper cladding layer 117 and first adhesive film 131. Thus, to achieve values of $D_S$ that are less than or equal to ~12 μm, ~9 μm or ~6 μm for single-mode coupling applications, the combined thickness of these layers should be less than or equal to ~12 μm, ~9 μm or ~6 μm, respectively. The spacing distance $D_S$ between core bodies 115 and 15 may also be made smaller by removing upper cladding layer 117 in the area of first attachment region 121. This means that the distance $D_S$ is set by the combined thickness of upper cladding layer 17 and first adhesive film 131. In the case where upper cladding layer 17 has a thickness of 3 μm, values of $D_S$ that are less than or equal to ~12 μm, ~9 μm or ~6 μm can be achieved by setting the thickness of first adhesive film 131 to values that are less than or equal to ~9 μm, ~6 μm or ~3 μm, respectively. Finally, for special single-mode coupling embodiments, the spacing distance $D_S$ between core bodies 115 and 15 may be made very small by removing both of upper cladding layers 17 and 117 in the area of first attachment region 121. This means that the distance $D_S$ is set by just the thickness of first adhesive film 131, which can be made as small as 2 μm to 5 μm.

Similar to the case of first attachment region 121, the spacing distance $D_S$ between core bodies 115 and 25 in the second attachment region may be made smaller by removing upper cladding layer 27 in the area of second attachment region 122. This means that the distance $D_S$ is set by the combined thickness of upper cladding layer 117 and second adhesive film 132. Thus, to achieve values of $D_S$ that are less than or equal to ~12 μm, ~9 μm or ~6 μm for single-mode coupling applications, the combined thickness of these layers should be less than or equal to ~12 μm, ~9 μm or ~6 μm, respectively. The spacing distance $D_S$ between core bodies 115 and 25 may also be made smaller by removing upper cladding layer 117 in the area of second attachment region 122. This means that the distance $D_S$ is set by the combined thickness of upper cladding layer 27 and second adhesive film 132. In the case where upper cladding layer 27 has a thickness of 3 μm, values of $D_S$ that are less than or equal to ~12 µm, 9 µm or ~6 µm can be achieved by setting the thickness of second adhesive film 132 to values that are less than or equal to ~9 µm, ~6 µm or ~3 µm, respectively. Finally, for special single-mode coupling embodiments, the spacing distance $D_S$ between core bodies 115 and 25 may be made very small by removing both of upper cladding layers 27 and 117 in the area of second attachment region 122. This means that the distance $D_S$ is set by just the thickness of second adhesive film 132, which can be made as small as 2 µm to 5 µm.

As another embodiment (not shown in the figures) of coupler 100, the second end 114 may be integrally formed with the optical waveguide layer 24 of substrate 20, in which case core bodies 115 and 25 would have ends that abut one another at second end 114. In this case, second attachment region 122 and second film 132 are not needed for this embodiment.

As an optional feature, which may be included by either of the above embodiments, the second cladding layer 117 may have an additional portion 118, as shown in FIG. 3, in the region that spans between first and second attachment regions 121 and 122. The transmission characteristics of core body 115, and in particular the effective index of refraction for optical waves propagating in core body 115, vary with the thickness of cladding layer 117. These variations can be reduced by increasing the thickness of layer 117. The addition of portion 118 further reduces these variations, and thus increases manufacturing uniformity of coupler 100.

Figure 5:
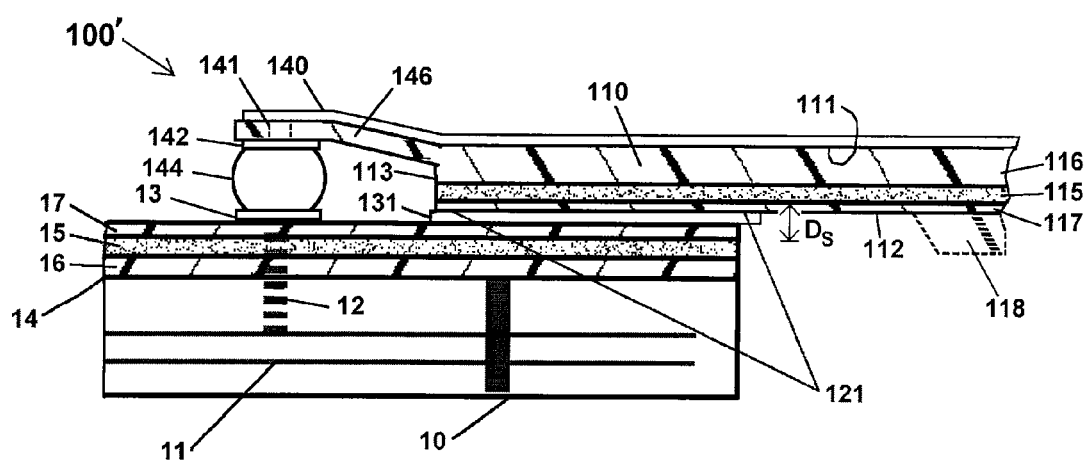
FIG. 5 shows a second embodiment of an attachment-type optical coupler according to the present invention.

FIG. 5 shows another optical coupler embodiment 100'. Optical coupler 100' has all of the elements of optical coupler 100 (the same reference numbers are used in the figure), and additionally comprises an electrical trace 140 disposed over the top surface 111 of element 100. Electrical trace 140 conveys an electrical signal between substrates 10 and 20 (not shown in FIG. 5). The distal end of electrical trace 140 extends past end 113, and is supported by an extension portion 146 of cladding layer 116 (as another approach, another dielectric layer may be disposed on top of cladding layer 116). To couple electrical trace 140 to electrical network 11 of substrate 10, a body 144 of conductive material (e.g., solder, conductive adhesive) may be used. To provide a wetting surface for solder ball 144, a contact pad 142 is disposed on the underside of extension portion 146, and a contact pad 13 is disposed on the top surface of substrate 10. A first electrical via 141 electrically couples contact pad 142 to electrical trace 140, and a second electrical via 12 electrically couples contact pad 13 to electrical network 11. As indicated by the dashed line in the figure, the location of via 12 is positioned so as not to cross through core body 15. A similar construction to that of elements 141-144 and 12-13 may be used at substrate 20 to electrically couple trace 140 to electrical network 21 of substrate 20. In addition, multiple instances of trace 140 may be disposed on top of element 110 in order to convey additional electrical signals between substrates 10 and 20. In this way, optical coupler 100' provides a plurality of optical interconnections as well as a plurality of electrical interconnections between substrates 10 and 20.

Figure 6:
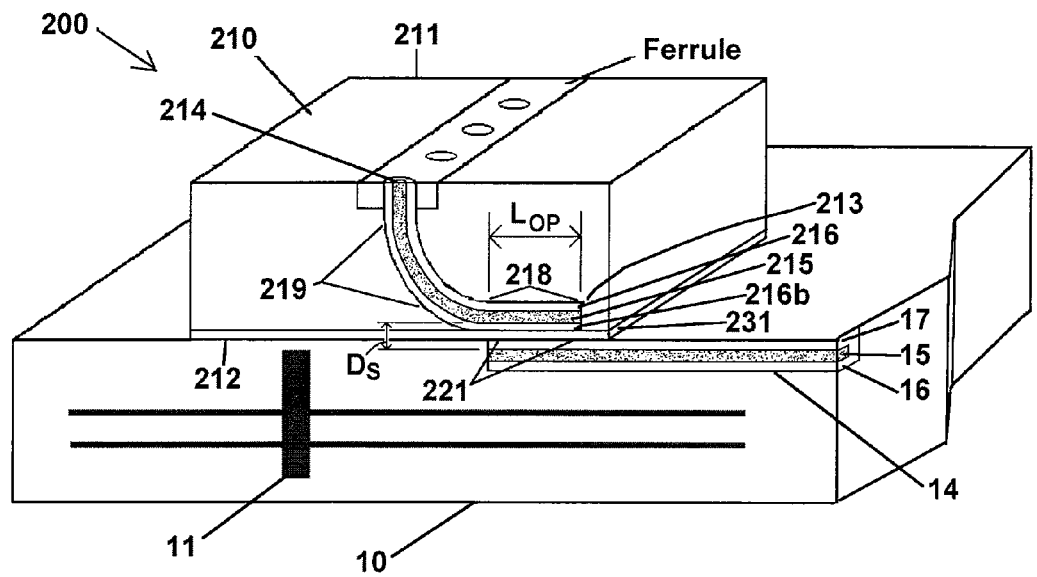
FIG. 6 shows a third embodiment of an attachment-type optical coupler according to the present invention.

By means of a cut-away perspective view, FIG. 6 shows another optical coupler embodiment 200 suitable for coupling optical signals between waveguides 14 of substrate 10 and a fiber array (not shown) disposed above the top surface of substrate 10. As before, waveguide 14 has core body 15 and cladding layers 16 and 17. The propagation paths of the optical signals in the fiber array make an angle with respect to the top surface of substrate 10 (usually perpendicular). Within coupler 200, the direction of the propagation paths is changed to be substantially parallel to the top surface of substrate 10. For this, coupler 200 comprises an element 210 having a top surface 211 and a bottom surface 212, and further comprises a body 215 of core material disposed between top surface 211 and bottom surface 212, and cladding material 216 disposed around at least a portion of core body 215. Core body 215 has a first end 213 disposed near bottom surface 212 (i.e., closer to bottom surface 212 than to top surface 211), and a second end 214 located near top surface 211 (i.e., closer to top surface 211 than bottom surface 212). The cut-away perspective view of FIG. 6 shows core body 215 and cladding material 216 in cross-section. Core body 215 is constructed (e.g., has an elongated dimension between ends 213 and 214) to convey light from first end 213 to second end 214, and vice versa. The optical signal is coupled between core body 15 and core body 215 in a coupling region 221 near first end 213 and along a segment 218 of core body 115, with segment 218 being disposed substantially parallel to bottom surface 212. A film 231 of adhesive material may be disposed between bottom surface 212 of element 210 and the top surface of substrate 10, including within attachment region 221. The optical signal is coupled to the fiber array directly at second end 214. Adhesive film 231 is preferably manufactured such that its bottom surface is in a sticky state prior to being adhered to the top surface of substrate 10. Adhesive film 231 may comprise an adhesive material that enables it and element 210 to be readily detached from substrate 10 to for testing and/or replacement. Adhesive film 231 typically has a peal strength of at least 100 to 150 grams per cm (in other words, it takes a peal force of at least 1 to 1.5 N/cm to peal off adhesive film 231).

In coupling region 221, the core bodies 215 and 15 are spaced from one another by spacing distance $D_S$ along an overlap length of $L_{OP}$, which is the length of segment 218. $L_{OP}$, $D_S$, and their ratio may have the values described above with respect to optical couplers 100 and 100'. For single mode coupling, $D_S$ is preferably less than or equal to 20 µm, and $L_{OP}$ is preferably greater than or equal to 1 mm. To reduce spacing distance $D_S$, the cladding material 216 below segment 218, which is indicated by reference number 216b, may be thinned or removed. In the case that cladding material 216b is removed, the distance $D_S$ is set by the combined thickness of upper cladding layer 17 and adhesive film 231. In the case where upper cladding layer 17 has a thickness of 3 µm, values of $D_S$ that are less than or equal to ~12 µm, ~9 µm or ~6 µm can be achieved by setting the thickness of adhesive film 231 to values that are less than or equal to ~9 µm, ~6 µm or ~3 µm, respectively. The spacing distance $D_S$ between core bodies 215 and 15 may be made smaller by removing upper cladding layer 17 in the area where optical coupler 200 is attached. This means that the distance $D_S$ is set by the combined thickness of cladding material 216b and adhesive film 231. Thus, to achieve values of $D_S$ that are less than or equal to ~12 µm, ~9 µm or ~6 µm, the combined thickness of these layers should be less than or equal to ~12 µm, ~9 µm or ~6 µm, respectively. Finally, the spacing distance $D_S$ between core bodies 215 and 15 may be made very small by removing both of upper cladding layer 17 and cladding material 216b in the manners discussed above. This means that the distance $D_S$ is set by just the thickness of adhesive film 231, which can be made as small as 2 µm to 5 µm, but preferably not more than 20 µm.

For multi-mode coupling, $D_S$ is generally less than or equal to 100 µm, and preferably less than or equal to 50 µm. $L_{OP}$ is several millimeters to tens of millimeters.

In preferred embodiments, core body 215 further comprises a curved segment 219 located between segment 218 and second end 214. Curved segment 219 is located between top surface 211 and bottom surface 212, and gradually changes the direction of the light propagation in core body 215 so that the light may enter or exit core body 215 at a non-zero angle (e.g., 90 degrees). While segment 219 is preferably curved, it may be appreciated that one may replace it with a straight segment and a reflecting element (e.g., mirror) disposed between the straight segment and segment 218.

Top surface 211 may be constructed to receive an MT coupler having a plurality of optical fibers that align to the ends 214 of core bodies 215. In this case, a ferrule may be provided at top surface 211. As another implementation, coupler 200 may be integrally formed as an end coupler for a fiber array (not shown in the figure). This may be constructed by encapsulating the end of the fiber array in the configuration shown in FIG. 6, and thereafter polishing the bottom surface of the resulting element 210 to obtain a desired value of $D_S$.

To aid alignment of coupler 200 to substrate 10, the body of element 210 may be formed of transparent or semi-transparent material, and conventional alignment marks (not shown) may be formed on both element 210 and substrate 10. Coupler 200 may be secured to substrate 10 by any means known or used in the art, or may also be secured to substrate 10 by an adhesive film like that of film 131.

Figure 7:
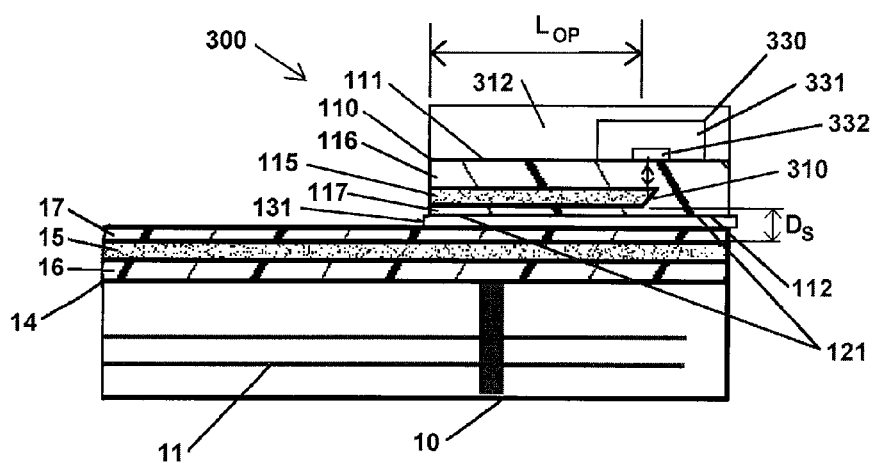
FIG. 7 shows a fourth embodiment of an attachment-type optical coupler according to the present invention.

FIG. 7 shows another optical coupler embodiment 300 suitable for coupling optical signals between a waveguide 14 of substrate 10 and an opto-electronic device 330 disposed above the top surface of substrate 10. As before, waveguide 14 has core body 15 and cladding layers 16 and 17. Opto-electronic device 330 comprises a support substrate 331 and a device 332, which may be a light emitter or light receiver. Examples of light emitters are edge-emitting lasers (with beveled coupling mirror), vertical-cavity surface-emitting lasers (VCSELs), and light-emitting diodes. Examples of light receivers are photo-diodes and photo-transistors. Similar to optical coupler 100 (shown in FIGS. 2 and 3), optical coupler 300 comprises element 110 with top surface 111 and bottom surface 112, core body 115 disposed between surfaces 111 and 112, cladding layer 116 disposed between core body 115 and top surface 111, optional cladding layer 117 disposed between core body 115 and bottom surface 112, attachment region 121, and attachment film 131, all as previously described above. Optical coupler 300 further comprises a reflector 310 disposed between top and bottom surfaces 111 and 112 of element 110, and positioned near core body 115 so as to couple light between core body 115 and device 332. Reflector 310 changes the direction of light propagation as the light travels through it. Reflector 310 may comprise a mirror with a backside coating of metal or dielectric material with a low refractive index, or with a backside air gap. Reflector 310 may also comprise a conventional grating structure.

Adhesive film 131 preferably has a refractive index lower than that of core body 115, but may have a refractive index equal to or higher than that of core body 115. Coupler 300 may further comprise an optional support layer 312 to provide additional rigidity to coupler 300, which can aid in aligning and attaching coupler 300 to substrate 10. To further aid in the alignment of coupler 300 to substrate 10, the body of element 110 and support layer 312 may be formed of transparent or semi-transparent material, and conventional alignment marks (not shown) may be formed on both coupler 300 and substrate 10.

$L_{OP}$, $D_S$, and their ratio may have the general and preferred values described above with respect to optical couplers 100 and 100' for single-mode coupling and multi-mode coupling. As before, the spacing distance $D_S$ between core bodies 115 and 15 may be made smaller by removing upper cladding layer 17 in the area of first attachment region 121. Also as before, the spacing distance $D_S$ between core bodies 115 and 15 may also be made smaller by removing upper cladding layer 117 in the area of first attachment region 121. Also as before, the spacing distance $D_S$ between core bodies 115 and 15 may be made very small by removing both of upper cladding layers 17 and 117 in the area of first attachment region 121. This means that the distance $D_S$ is set by just the thickness of first adhesive film 131, which can be made as small as 2 μm to 5 μm, but preferably not more than 20 μm for single-mode coupling, and not more than 100 μm for multi-mode coupling.

Figure 1:
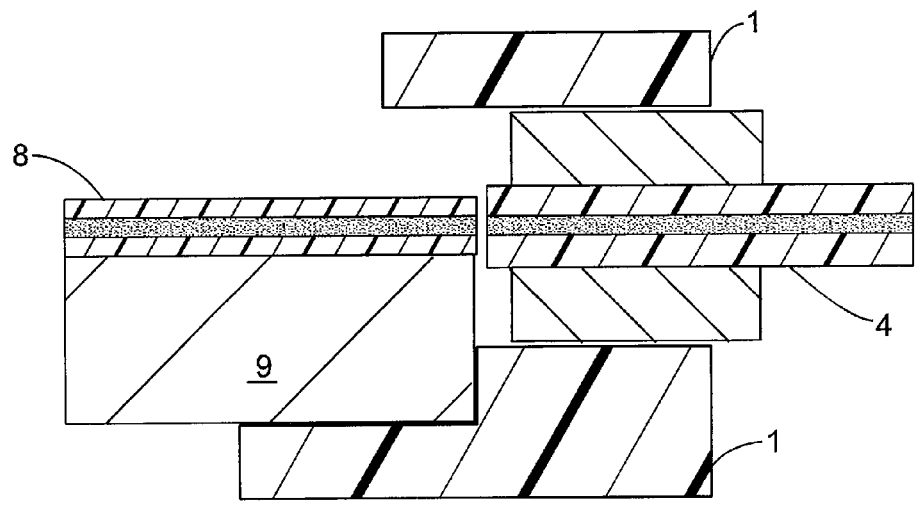
FIG. 1 shows a cross-sectional view of a conventional coupler according to the prior art.

As indicated above, one object of the present invention is to reduce the cost of manufacturing the optical couplers. Each of the optical couplers described above and each additional one described below can be mass-produced by conventional waveguide manufacturing processes, thereby substantially reducing the manufacturing costs compared to those required for the coupler shown in FIG. 1. Another object of the present invention is to increase the accuracy of the alignment of optical couplers to optical substrates. The optical couplers described herein can be readily positioned and attached to optical substrates using conventional surface-mounting equipment used in the electronics industry. In addition, alignment marks can be readily incorporated onto the optical couplers during the mass-production process, and the optical couplers can be readily made semi-transparent to allow alignment to the optical substrates from the top. These features reduce the costs of alignment as well. Another object of the present invention is to reduce the area needed to provide substrate-to-substrate optical coupling. Because the overlap distance $L_{OP}$ is typically between 1 mm to 4 mm for single-mode coupling, the amount of space needed on the optical substrate for coupling by the optical coupler is relatively small compared to that required by the coupler shown in FIG. 1. In addition, a large number of optical signals may be coupled by an optical coupler by forming several core bodies 115 in parallel in the coupler (two are shown in FIG. 1, four are shown in FIG. 6). The spacing distance between the parallel core bodies 115 can be as small as about 30 μm when core bodies are configured to convey single-mode light, thereby enabling a high density of optical signals. Another object of the present invention is to enable the creation of new opto-electric devices. This is illustrated below.

Figure 8:
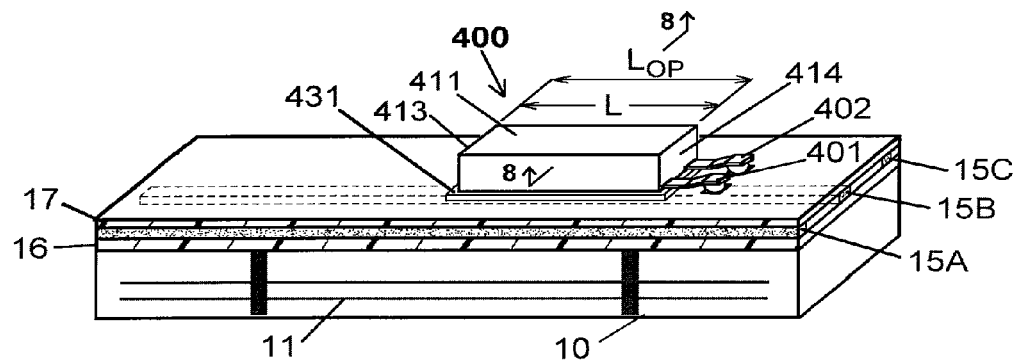
FIG. 8 shows a perspective view of an attenuating attachment-type optical coupler device according to the present invention.
Figure 9:
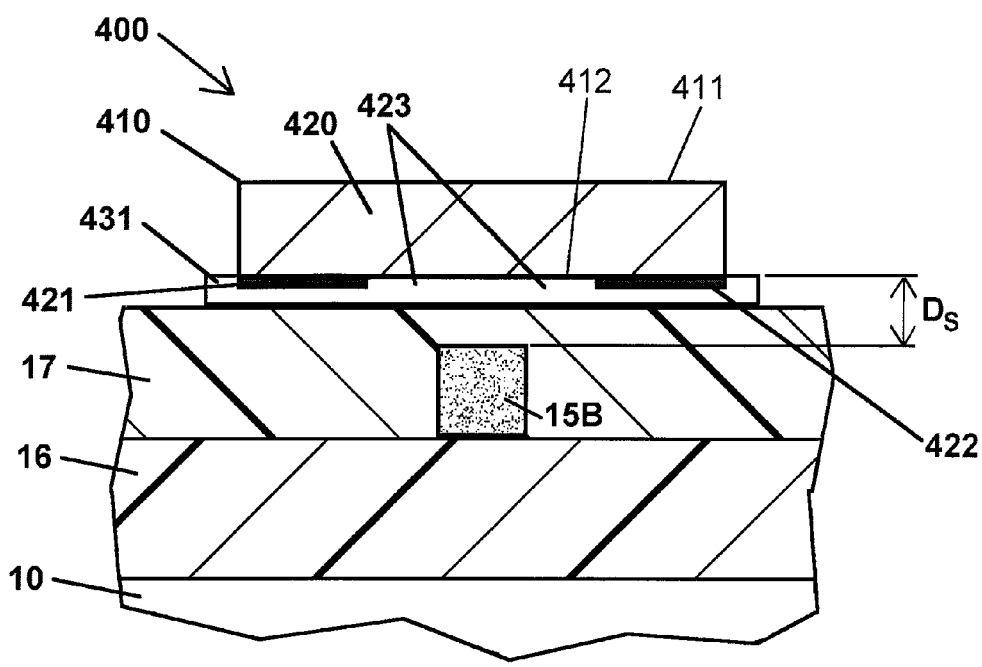
FIG. 9 shows a cross-sectional view of a portion of the optical coupler device shown in FIG. 8 according to the present invention.

The present invention enables new types of opto-electric devices. FIG. 8 shows a perspective view of one such device, an attenuating optical coupler 400 that may be adhered to the top surface of substrate 10, above an optical waveguide having a core body 15B. Coupler 400 operates to selectively attenuate the optical signal propagating along core body 15B by selectively coupling part of the optical signal away from core body 15B and dissipating it. The amount of such coupling is controlled by an electric potential applied to two terminals 401 and 402, which are electrically coupled to respective electrical pads on substrate 10 by respective solder bumps. FIG. 9 shows a cross-sectional view of coupler 400, as taken along the cut lines shown in FIG. 8. Referring to both FIGS. 8 and 9, coupler 400 comprises an element 410 having a top surface 411, a bottom surface 412, a first end 413, a second end 414, and a length L between ends 413 and 414. The element further has a body 420 (FIG. 9) of electro-optic material disposed between top surface 411 and bottom surface 412 and extending along its length L. The electro-optic material of body 420 has a refractive index that is a function of the electric field applied to the material.

Element 410 further comprises a first electrode 421 and a second electrode 422 disposed to generate an electric field across at least a portion of body 420 of electro-optic material. Electrode 421 (FIG. 9) is electrically coupled to terminal 401 (FIG. 8), and electrode 422 (FIG. 9) is electrically coupled to terminal 402 (FIG. 8). Electrodes 421 and 422 may be disposed in a number of configurations. As shown in FIG. 9, in one exemplary configuration, the electrodes are disposed on bottom surface 412 along the direction of the length L, and along respective sides of element 410. There is a gap 423 between the electrodes, and coupler 400 is preferably positioned over the top surface of substrate 10 such that gap 423 overlies a portion of core body 15B and is substantially parallel thereto, as best seen in FIG. 9. As another possible electrode configuration, one electrode may be disposed on top surface 411, and the second electrode may be disposed on the bottom surface 412 in one or both of the locations shown in FIG. 9 for electrodes 421 and 422.

A film 431 of adhesive material is disposed on the bottom surface 412 of the element 410, the film having a thickness equal to or less than 20 µm when core body 15B is configured to convey single-mode light, and equal to or less than 100 µm when core body 15B is configured to convey multi-mode light. The spacing distance between the top of the core body 15B in substrate 10 and the bottom of body 420 of electro-optic material is indicated as $D_S$. In addition, there is an overlap distance $L_{OP}$ of body 420 and core body 15B along the direction of length L. In the embodiment illustrated in FIGS. 8 and 9, the overlap distance $L_{OP}$ is equal to the length L. Adhesive film 431 preferably has a refractive index that is less than that of core body 15B, and more preferably substantially equal to that of upper cladding layer 17. Using Δn to represent the difference between the refractive indices of core body 15B and upper cladding layer 17, the refractive index of adhesive layer 431 is preferably within ±½Δn of the refractive index of upper cladding layer 17. Adhesive film 431 is preferably manufactured such that its bottom surface is in a sticky state prior to being adhered to the top surface of substrate 10. Adhesive film 431 may comprise an adhesive material that enables it and element 410 to be readily detached from substrate 10 to enable testing and/or replacement. Adhesive film 431 typically has a peal strength of at least 10 to 15 grams per cm (in other words, it takes a peal force of at least 0.1 to 0.15 N/cm to peal off adhesive film 431), and preferably a peal strength of at least 100 g/cm (peal force of 1N/cm).

$L_{OP}$, $D_S$, and their ratio may have the general and preferred values described above with respect to optical couplers 100 and 100' for single-mode and multi-mode coupling. The spacing distance $D_S$ between body 420 and core body 15B may be made smaller by removing that portion of upper cladding layer 17 that is above core body 15B and that is in the area wherein element 410 is attached. This means that the distance $D_S$ is set by the thickness of adhesive film 431. Thus, to achieve values of $D_S$ that are less than or equal to ~12 µm, ~9 µm or ~6 µm for single-mode coupling, the thickness of film 431 should be less than or equal to ~12 µm, ~9 µm or ~6 µm, respectively. The thickness of adhesive film 431 can be made as small as 2 µm to 5 µm.

For multi-mode coupling, $D_S$ is generally less than or equal to 100 µm, and preferably less than or equal to 50 µm. $L_{OP}$ is several millimeters to tens of millimeters.

As indicated above, body 420 of electro-optic material has a refractive index that varies as a function of the electric field applied to it by electrodes 421 and 422. Voltage is applied to electrodes 421 and 422 to create different potentials on electrodes 421 and 422, and to generate the electric field. (As is known in the art, the voltage applied to electrodes 421 and 422 is equal to the difference in their potentials.) The electric field is directed from electrode 421 to electrode 422 (which may be called the "first direction") when the potential of electrode 421 is greater than the potential of electrode 422. The electric field is directed from electrode 422 to electrode 421 (which may be called the "second direction") when the potential of electrode 422 is greater than the potential of electrode 421. Depending upon the orientation of the atoms or molecules in body 420, the refractive index of body 420 can increase as the electric field is increased in the first direction and decrease as the electric field is increased in the second direction; or it can decrease as the electric field is increased in the first direction and increase as the electric field is increased in the second direction.

When the refractive index of body 420 is less than that of cladding layer 17, body 420 acts substantially as a cladding layer, and little or no light is coupled from core body 15B to body 420, and thus substantially no attenuation occurs. When the refractive index is greater than that of cladding layer 17, body 420 acts substantially like a core body, and an amount of light is coupled from core body 15B to body 420. As such, the light propagating through core body 15B is effectively attenuated. The amount of light coupled to body 420 increases as the refractive index of body 420 increases. Since the refractive index of body 420 depends upon the electric field applied by electrodes 421 and 422, the amount of light coupled to body 420 is a function of the voltage applied between electrodes 421 and 422, and thus the amount of light attenuated in core body 15B is a function of the voltage applied between electrodes 421 and 422.

The electro-optic material of body 420 can be readily selected such that there is no attenuation of light through core body 15B when no voltage is applied to electrodes 421 and 422 (e.g., a "normally-off" attenuator). This can be done by selecting the electro-optical material to have an intrinsic refractive index (i.e., the value of the refractive index without a voltage or electric field applied) that is less than the refractive index of core layer 15B by an amount of at least 0.1%, and generally less than the refractive index of core layer 15B by a value of ½Δn. Then, as voltage is applied to the electrodes, the refractive index of body 420 increases to a value that enables body 420 to draw light from core body 15B. Accordingly, the optical signal in core body 15B is attenuated by an amount that is in relation to the voltage applied between electrodes 421 and 422.

The electro-optic material of body 420 can also be readily selected such that there is partial or complete attenuation of light through core body 15B when no voltage is applied to electrodes 421 and 422 (e.g., a "normally-on" attenuator). This can be done by selecting the electro-optical material to have an intrinsic refractive index that is substantially equal to or greater than the refractive index of core layer 15B. Then, as voltage is applied to the electrodes in one direction, the refractive index of body 420 increases and enables body 420 to draw more light from core body 15B, and thereby increasing the attenuation. As voltage is applied to the electrodes in the opposite direction, the refractive index of body 420 decreases and causes body 420 to draw less light from core body 15B, and thereby decreasing attenuation. Accordingly, the optical signal in core body 15B is attenuated in relation to the voltage applied between electrodes 421 and 422.

Figure 10:
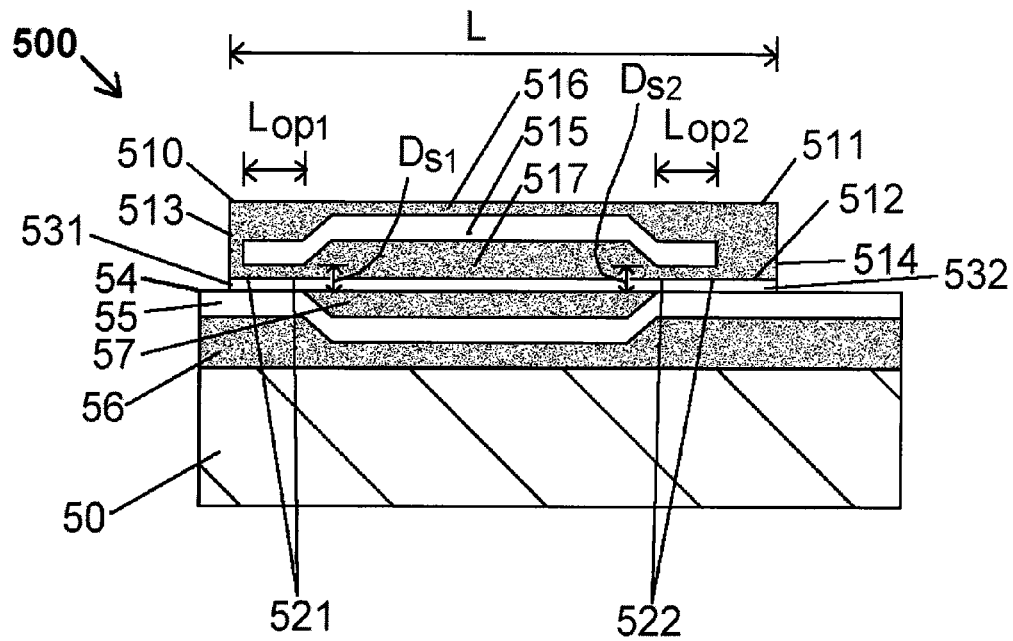
FIG. 10 shows a cross-sectional view of a Mach-Zehnder structure employing vertical coupling according to the present invention.
Figure 11:
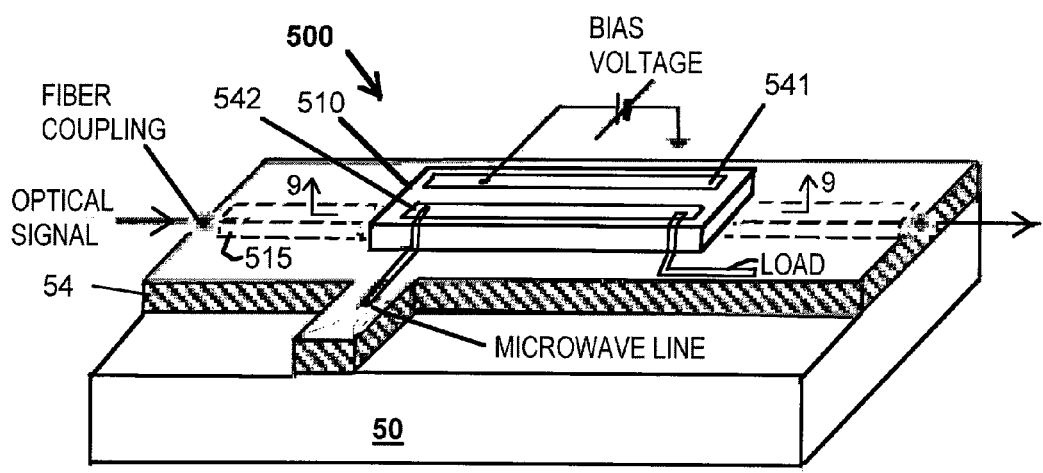
FIG. 11 shows a perspective view of the Mach-Zehnder structure shown in FIG. 10 according to the present invention.

Another new device enabled by the present invention is a vertical Mack-Zehnder structure shown at 500 in FIG. 10 (cross-sectional view) and FIG. 11 (perspective view). Structure 500 may be used as a switch or an optical modulator. Structure 500 is intended to attach to a conventional waveguide 54 formed over a substrate 50. Waveguide 54 comprises a lower cladding layer 56, a core layer 55, and an optional upper cladding layer 57. Structure 500 comprises an element 510 that attaches over waveguide 54, and that couples a portion of the light in waveguide 54 at one point and re-couples the light back into waveguide 54 at a second point with a different phase. The difference in phase modulates the intensity of the light to be modulated at the second point according to the Mach-Zehnder interferometer theory.

Element 510 comprises a top surface 511, a bottom surface 512, a first end 513, a second end 514, and a length L between first end 513 and second end 514. Element 510 further comprises a body of core material 515 disposed between the top surface 511 and bottom surface 512 and extending along the length L, a first body of cladding material 516 disposed along at least a portion of core body 515 and at least above core body 515, and a second body of cladding material 517 disposed along at least a portion of core body 515 and at least above core body 515. Only one of cladding bodies 516 and 517 is needed, but both may be used. Body 515 of core material is constructed to convey light in a direction substantially parallel to the bottom surface 512 of element 510 (e.g., it has an elongated dimension in the direction of length L). Element 510 further comprises a first attachment region 521 located at the bottom surface 512 of element 510 closer to first end 513 than second end 514, and a second attachment region 522 located at the bottom surface 512 closer to second end 514 than first 513.

In first attachment region 521, there is a first spacing distance $D_{S1}$ between core body 515 and waveguide core 55, and core body 515 has a first overlap length $L_{OP}$, over which it has the first spacing distance $D_{S1}$ to waveguide 54. Similarly, in second attachment region 522, there is a second spacing distance $D_{S2}$ between core body 515 and waveguide core 55, and core body 515 has a second overlap length $L_{OP2}$ over which it has the second spacing distance $D_{S2}$ to waveguide 54. The attachment regions 521 and 522 are attached to the top surface of waveguide 54 (and over core body 55) by two respective films 531 and 532 of adhesive material disposed on bottom surface 512. Adhesive films 531 and 532 may collectively comprise a common adhesive film disposed on bottom surface 512 along the length L. Adhesive films 531,532 are preferably manufactured such that their bottom surfaces are in a sticky state prior to being adhered to the top surface of substrate 50. The adhesive films may comprise an adhesive material that enables then and element 510 to be readily detached from substrate 50 to enable testing and/or replacement. Each of adhesive films 531 and 532 typically has a peal strength of at least 10 to 15 grams per cm (in other words, it takes a peal force of at least 0.1 to 0.15 N/cm to peal off the adhesive film), and preferably a peal strength of at least 10 g/cm (peal force of 1N/cm).

In general, the amount of coupling that occurs in first attachment region 521 is different from the amount that occurs in second attachment region 522. As an example, when light is traveling from left to right in core body 55, about 50% of the light in core body 55 is coupled to core body 515 in first attachment region 521, and about 95% of the light in core body 515 is coupled back to core body 55 in section attachment region 522. This is consistent with the Mach-Zehnder theory of operation where the light is split into two substantially equal paths, and thereafter recombined. In practice, one would like to achieve 100% coupling in second attachment region 521, but one often achieves a percentage that is less than 100%. However, this can be compensated by increasing the percentage coupled in first attachment region 521 to above 50%, by using the following relationship: $X=(100\%)^2/(100\%+Y)$, where Y is the coupling percentage at second attachment region 522, and X is the coupling percentage at first attachment region 521. Thus, if Y=90%, then X would equal 52.63%. The values of $D_{S1}$, $L_{OP1}$, $D_{S2}$, and $L_{OP2}$ can be readily selected to achieve desired values of X and Y. In general, for single-mode coupling, both $D_{S1}$ and $D_{S2}$ will not be more than 20 µm, and $L_{OP1}$ and $L_{OP2}$ will be equal to or greater than 1 mm. As before, the spacing distances $D_{S1}$ and $D_{S2}$ may be made smaller by removing upper cladding layer 57 in the areas of first attachment regions 521 and 522 (which is shown in the figure). Also as before, the spacing distances $D_{S1}$ and $D_{S2}$ may also be made smaller by removing upper cladding layer 517 in the areas of first attachment regions 521 and 522. Also as before, the spacing distances $D_{S1}$ and $D_{S2}$ may be made very small by removing both of upper cladding layers 57 and 517 in the areas of the attachments region 521 and 522. This means that the distance $D_S$ is set by just the thickness of the adhesive films 531 and 532, which can be made as small as 2 µm to 5 µm.

The Mach-Zehnder interferometer effect may be accomplished by varying the refractive index of core body 515, and/or the refractive index of cladding body 516, and/or the refractive index of cladding body 517. A change in the refractive index in one or more of bodies 515-517 causes a change in the propagation speed of the light in core body 515, which introduces a change in phase of the light signal in core body 515 relative to the light signal in core body 54 over the length of core body 515. Typically, one or both of the cladding bodies 516 and 517 comprise electro-optic material, whereas core body 515 typically does not. As indicated above with respect to coupler 400, the refractive index may be changed by applying an electric field, which in turn may be generated by two electrodes. These electrodes may be formed in or on element 510, or may be disposed in close proximity, such as on substrate 50. FIG. 11 shown a perspective view of coupler 500 where two electrodes are integrated on the top surface 511 of element 510. A first electrode 541 provide a bias voltage, and a second electrode 542 provide a modulating signal that modulates the electric field within portions of element 510, specifically portions of the electro-optic material contained therein. For high-speed modulation, the signal to second electrode 542 is coupled in by way of a microwave line (e.g., fin-line) at one end of electrode 542, and a microwave termination load is provided at the other end.

Referring back to FIG. 10, it is desirable to widen the distance between core bodies 55 and 515 in the area between attachment regions 521 and 522. This prevents further coupling of optical signals between bodies 55 and 515, and prevents any changes in the refractive index of layers 515 and 517 from affecting the propagation speed of the optical signal in core body 55. This widening may be accomplished by etching shallow troughs in lower cladding layers 56 and 516 before core bodies 55 and 515 are formed. Etching steps for accomplishing this are well known to the art. Another characteristic feature of the device is that the ends of core body 515 terminate in passive material having a lower refractive index. The can also be said of preferred embodiments of core body 115 and core body 215 (and end 213) described above, where air has a lower refractive index.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An optical coupler comprising:
    an element having a top surface, a bottom surface, a first end, a second end, and a length between the first and second ends, the element further having a body of electro-optic material disposed between the top and bottom surfaces and extending along the length, the electro-optic material having a refractive index that is a function of an electric field applied to the material;
    a first electrode and a second electrode positioned to generate an electric field in at least a portion of the body of electro-optic material;
    an attachment region located at the bottom surface of the element, wherein the attachment region is attached to a surface of a substrate and over a core body of the substrate, wherein there is a distance $D_S$ from the body of electro-optic material to the core body of the substrate and wherein $D_S$ is not more than 100 µm;
    a film of adhesive material disposed on the attachment region, the film having a top surface and a bottom surface opposite to the top surface, the top surface of the film abutting the bottom surface of the element at the attachment region; and
    a distance of not more than 100 µm from the body of electro-optic material to a point on the bottom surface of the film.

2. The optical apparatus of claim 1 wherein the distance from the body of electro-optic material to a point on the bottom surface of the film is not more than about 20 µm.

3. The optical coupler of claim 1 wherein the body of electro-optic material has a length that runs parallel to the length of the element, wherein the length of the body of electro-optic material is at least 1 mm.

4. The optical coupler of claim 3 wherein the ratio of the length of the body of electro-optic material to the distance from the body of electro-optic material to a point on the bottom surface of the film is at least 200.

5. The optical coupler of claim 1 wherein $D_S$ is not more than 20 µm.

6. The optical coupler of claim 1 wherein the length of the body of electro-optic material overlaps the core body of the substrate by an overlap distance $L_{OP}$, and wherein $L_{OP}$ is least 1 mm.

7. The optical coupler of claim 6 wherein the ratio of $L_{OP}$ to $D_S$ is at least 200.

8. An optical modulator, the optical modulator comprising:
    an optical waveguide having a bottom surface, a lower cladding layer disposed above the bottom surface, a core layer formed over the lower cladding layer, and a top surface above the core layer; and
    an optical coupler comprising:
        an element having a top surface, a bottom surface, a first end, a second end, and a length between the first and second ends, the element further having a body of electro-optic material disposed between the top and bottom surfaces and extending along the length, the electro-optic material having a refractive index that is a function of an electric field applied to the material;
        a first electrode and a second electrode positioned to generate an electric field in at least a portion of the body of electro-optic material;
        an attachment region located at the bottom surface of the element;
        a film of adhesive material disposed on the attachment region, the film having a top surface and a bottom surface opposite to the top surface, the top surface of the film abutting the bottom surface of the element at the attachment region; and
        a distance of not more than 100 µm from the body of electro-optic material to a point on the bottom surface of the film;
    wherein the film of the adhesive material of the optical coupler is adhered to a first portion of the top surface of the optical waveguide.

9. An optical coupler comprising:
    an element having a top surface, a bottom surface, a first end, a second end, and a length between the first and second ends, the element further having a body of core material disposed between the top and bottom surfaces and extending along the length, the element further having a body of cladding material disposed along at least a portion of the body of core material, the body of core material constructed to convey light in a direction substantially parallel to the bottom surface of the element, at least one of the core material and cladding material comprising an electro-optic material having a refractive index that is a function of an electric field applied to the material;
    a first attachment region located at the bottom surface of the element closer to the first end than the second end;
    a second attachment region located at the bottom surface of the element closer to the second end than the first end;
    a film of adhesive material disposed on the first attachment region and on the second attachment region, the film having a top surface and a bottom surface opposite to the top surface, the top surface of the first film abutting the bottom surface of the element at each of the attachment regions; and
    a distance of not more than 100 µm from the body of core material to a point on the bottom surface of the film in each of the attachment regions;
    wherein the first attachment region is attached to a surface of a substrate and over a core body of the substrate and the second attachment region is attached to the surface of the substrate and over the core body of the substrate, wherein there is a spacing distance $D_{S1}$ from the body of core material to the core body of the substrate in the first attachment region and a spacing distance $D_{S2}$ from the body of core material to the core body of the substrate in the second attachment region, wherein $D_{S1}$ is not more than 100 µm and $D_{S2}$ is not more than 100 µ.

10. The optical coupler of claim 9 further comprising a first electrode and a second electrode positioned to generate an electric field in at least a portion of the electro-optic material.

* * * * *

UNITED STATES PATENT AND TRADEMARK OFFICE
CERTIFICATE OF CORRECTION

PATENT NO. : 7,489,842 B2
APPLICATION NO. : 11/837296
DATED : February 10, 2009
INVENTOR(S) : Kishio Yokouchi It is certified that error appears in the above-identified patent and that said Letters Patent is hereby corrected as shown below:

Col. 3, Ln. 46: After "at least" delete "10g/cm" and insert -- 100g/cm --;

Col. 5, Ln. 67: Before "35%" insert -- ~ --;

Col. 6, Ln. 4: Before "80%" insert -- ~ --;

Col. 13, Ln. 24: After "length" delete "$L_{0P}$" and insert -- $L_{0P1}$ --;

Col. 13, Ln. 34: After "at least" delete "10g/cm" and insert -- 100g/cm --;

Col. 16, Ln. 53 Claim 9: After "$\mu$" insert -- m --.

Signed and Sealed this

Thirteenth Day of October, 2009

David J. Kappos
*Director of the United States Patent and Trademark Office*